United States Patent
Chylinski et al.

(10) Patent No.: US 11,220,340 B2
(45) Date of Patent: Jan. 11, 2022

(54) GALLEY CART BAY RUB STRIP ASSEMBLY WITH ENHANCED AIRFLOW

(71) Applicant: Rockwell Collins, INc., Cedar Rapids, IA (US)

(72) Inventors: Rafal H. Chylinski, Milton Keyes (GB); Nick Undricov, Milton Keynes (GB); Peter John Leslie Burd, Burry Port (GB)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/181,634

(22) Filed: Nov. 6, 2018

(65) Prior Publication Data

US 2020/0115057 A1    Apr. 16, 2020

Related U.S. Application Data

(63) Continuation-in-part of application No. 13/852,631, filed on Mar. 28, 2013, now Pat. No. 10,124,894.

(51) Int. Cl.
*B60H 1/26*    (2006.01)
*B64D 11/04*    (2006.01)
(Continued)

(52) U.S. Cl.
CPC .......... *B64D 11/04* (2013.01); *B64D 11/0007* (2013.01); *B64D 13/08* (2013.01); *B64D 2013/0629* (2013.01)

(58) Field of Classification Search
CPC ...... B64D 11/04; B64D 11/0007; B64D 13/08
(Continued)

(56) References Cited

U.S. PATENT DOCUMENTS 3,308,738 A * 3/1967 Heimann .................. B60P 3/20
                                                        454/90
4,399,737 A * 8/1983 Severson ................. B60H 1/26
                                                        454/90
(Continued)

FOREIGN PATENT DOCUMENTS

DE         3812739 C1    7/1989
DE         60107814      12/2005
(Continued)

OTHER PUBLICATIONS

Extended Search Report dated Apr. 17, 2020 for EP Application No. 19207505.9.

*Primary Examiner* — Helena Kosanovic
(74) *Attorney, Agent, or Firm* — Suiter Swantz pc llo (57) ABSTRACT

A cart bay for an aircraft galley structure includes a housing defined by interior surfaces and capable of housing one or more removable galley carts in a secured position. Chilled air is introduced into the cart bay through a plenum of inlet to maintain perishable contents of the galley cart at a safe temperature. The side walls of the cart bay include rubstrip assemblies for guiding the galley carts in and out of the bay, absorbing impact and noise. The rubstrip assemblies may include a corrugated carrier layer behind a solid rubstrip; the corrugated carrier layer includes apertures for controlling and directing the flow of chilled air along the side walls to maximize the exterior surfaces of the galley carts reachable by the chilled air, separating the galley carts from the side walls and allowing chilled air to reach the side exterior surfaces of the galley carts via the apertures.

16 Claims, 8 Drawing Sheets

(51) Int. Cl.
  B64D 11/00 (2006.01)
  B64D 13/08 (2006.01)
  B64D 13/06 (2006.01)

(58) Field of Classification Search
  USPC .................................................... 454/143, 76
  See application file for complete search history.

(56) References Cited

U.S. PATENT DOCUMENTS

| | | | |
|---|---|---|---|
| 4,884,496 A * | 12/1989 | Donavich | B60P 3/20 |
| | | | 454/88 |
| 4,914,879 A * | 4/1990 | Goldberg | E04B 1/14 |
| | | | 52/242 |
| 4,969,509 A * | 11/1990 | Merensky | B64D 13/08 |
| | | | 165/104.34 |
| 5,397,010 A | 3/1995 | Gibot | |
| 5,655,595 A | 8/1997 | Westbrooks, Jr. | |
| 5,890,325 A * | 4/1999 | Corcorran | A47B 21/00 |
| | | | 52/36.1 |
| 5,947,812 A | 9/1999 | Henning et al. | |
| 6,073,547 A | 6/2000 | Westbrooks, Jr. et al. | |
| 6,315,039 B1 | 11/2001 | Westbrooks, Jr. et al. | |
| 6,684,657 B1 | 2/2004 | Dougherty | |
| 6,845,627 B1 | 1/2005 | Buck | |
| 6,860,115 B2 | 3/2005 | Norelius et al. | |
| 7,025,121 B2 | 4/2006 | Whitehead et al. | |
| 7,231,778 B2 | 6/2007 | Rigney et al. | |
| 7,458,441 B2 | 12/2008 | Hu | |
| 7,641,058 B2 * | 1/2010 | Silverman | B05B 15/62 |
| | | | 211/66 |
| 7,967,249 B2 | 6/2011 | Muhlthaler et al. | |
| 8,127,948 B2 * | 3/2012 | Davis | A47F 5/01 |
| | | | 211/186 |
| 8,225,622 B2 | 7/2012 | Uluc et al. | |
| 9,359,078 B2 * | 6/2016 | Burd | B64D 11/04 |
| 2005/0028543 A1 | 2/2005 | Whitehead et al. | |
| 2009/0301120 A1 | 12/2009 | Godecker et al. | |
| 2010/0050665 A1 | 3/2010 | Oswald et al. | |
| 2013/0260662 A1 | 10/2013 | Burd | |
| 2017/0151358 A1 * | 6/2017 | Tan | A61L 2/06 |
| 2018/0016012 A1 | 1/2018 | Burd et al. | |

FOREIGN PATENT DOCUMENTS

| | | |
|---|---|---|
| DE | 102006017012 A1 | 10/2007 |
| EP | 0591047 A1 | 4/1994 |
| EP | 2933190 A1 | 10/2015 |
| EP | 3318491 A1 | 5/2018 |
| ES | 2380833 T3 | 5/2012 |
| FR | 2696158 A1 | 4/1994 |
| GB | 1526160 A | 9/1978 |
| GB | 1595961 A | 8/1981 |
| JP | H11079261 A | 3/1999 |
| JP | 2001301624 A | 10/2001 |
| JP | 2007537077 A | 12/2007 |
| JP | 2009533265 A | 9/2009 |
| WO | 0158788 A1 | 8/2001 |
| WO | 2005063566 A2 | 7/2005 |

* cited by examiner

GALLEY CART BAY RUB STRIP ASSEMBLY WITH ENHANCED AIRFLOW

CROSS-REFERENCE TO RELATED APPLICATIONS

The instant application claims priority under 35 U.S.C. § 120 as a continuation-in-part of U.S. patent application Ser. No. 13/852,631 entitled AIRCRAFT GALLEY CHILLED AIR DISTRIBUTION SYSTEM, filed Mar. 28, 2013 and published Oct. 3, 2013 as U.S. Patent Publication 2013/0260662. Said U.S. patent application Ser. No. 13/852,631 is herein incorporated by reference in its entirety.

BACKGROUND

Aircraft galley structures may incorporate numerous cart bays in which galley carts (e.g., food service trolleys, catering carts) capable of assisted travel along interior surfaces of the aircraft (e.g., being pushed down an aisle for in-seat food or refreshment service) may be stowed inflight. Cart bays may include internal rubstrips (e.g., bumper strips) to protect the galley walls from the repeated impact of a fully loaded galley cart, e.g., while being removed from or stowed into the cart bay. Further, rubstrips may serve as spacers or packers for controlling the lateral position of the galley cart, providing clearance from floor attachments or other obstacles, and preventing the cart from tipping. Rubstrips must necessarily be resilient (e.g., sufficiently robust to withstand regular impacts from a fully loaded cart multiple times per flight), but also easily cleanable and replaceable. With these considerations in mind, conventional rubstrips may be of solid or hollow plastic construction, having a uniform cross section.

However, galleys designed for storage of perishable food provide for the refrigeration of interior compartments by chilled air supplied by a source integral or external to the cart bays (e.g., air-to-air galley air chillers or liquid-to-air air chiller units (ACU)). In such an environment, solid rubstrips may obstruct the flow of chilled air through the cart bay interior and around the stowed galley carts. Federal and international regulations (e.g., EASA (European Aviation Safety Agency), Federal Aviation Administration (FAA), Food and Drug Administration (FDA), AiB/BAC) may provide for mandatory operational parameters for inflight perishable food storage; the obstruction of chilled air flow by solid rubstrips may hinder the ability of chilled air sources to meet these parameters.

SUMMARY

In one aspect, embodiments of the inventive concepts disclosed herein are directed to an aircraft galley cart bay capable of securing galley carts (e.g., singly or in pairs) within a housing. Chilled air may be introduced into the cart bay via a plenum or inlet in the upper surface or rear back wall of the bay for distribution throughout the bay and around the exterior surfaces of any galley carts stowed therein. The side walls of the cart bay incorporate rubstrip or bumper assemblies for guiding the galley carts into the cart bay (e.g., via chamfered endcaps) and securing the carts in a stable lateral stowed position. Rubstrip assemblies include an outer rubstrip capable of absorbing impact force of the carts as well as the associated sounds; the outer rubstrip may be set off from the side wall by a solid or corrugated (e.g., partially hollow) carrier layer. A corrugated carrier layer provides a series of apertures allowing chilled air to pass down the side walls and throughout the exterior surfaces of the galley carts. The volume and direction of the chilled airflow may be controlled based on the amount, size, and orientation of the apertures.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a galley cart bay capable of securing fully loaded galley carts (e.g., within which perishable foods may be stored) in a stable inflight stowed position without impeding the ability of onboard galley air chiller devices to circulate chilled air throughout the cart bays and maintain required parameters for inflight perishable food storage. The cart bay incorporates flexible rubstrip assemblies capable of creating apertures of variable number and size between the galley carts and the cart bay walls. Chilled air circulating through the cart bay can be directed through the apertures to reach the lower exterior surfaces of the galley cart.

Figure 1:
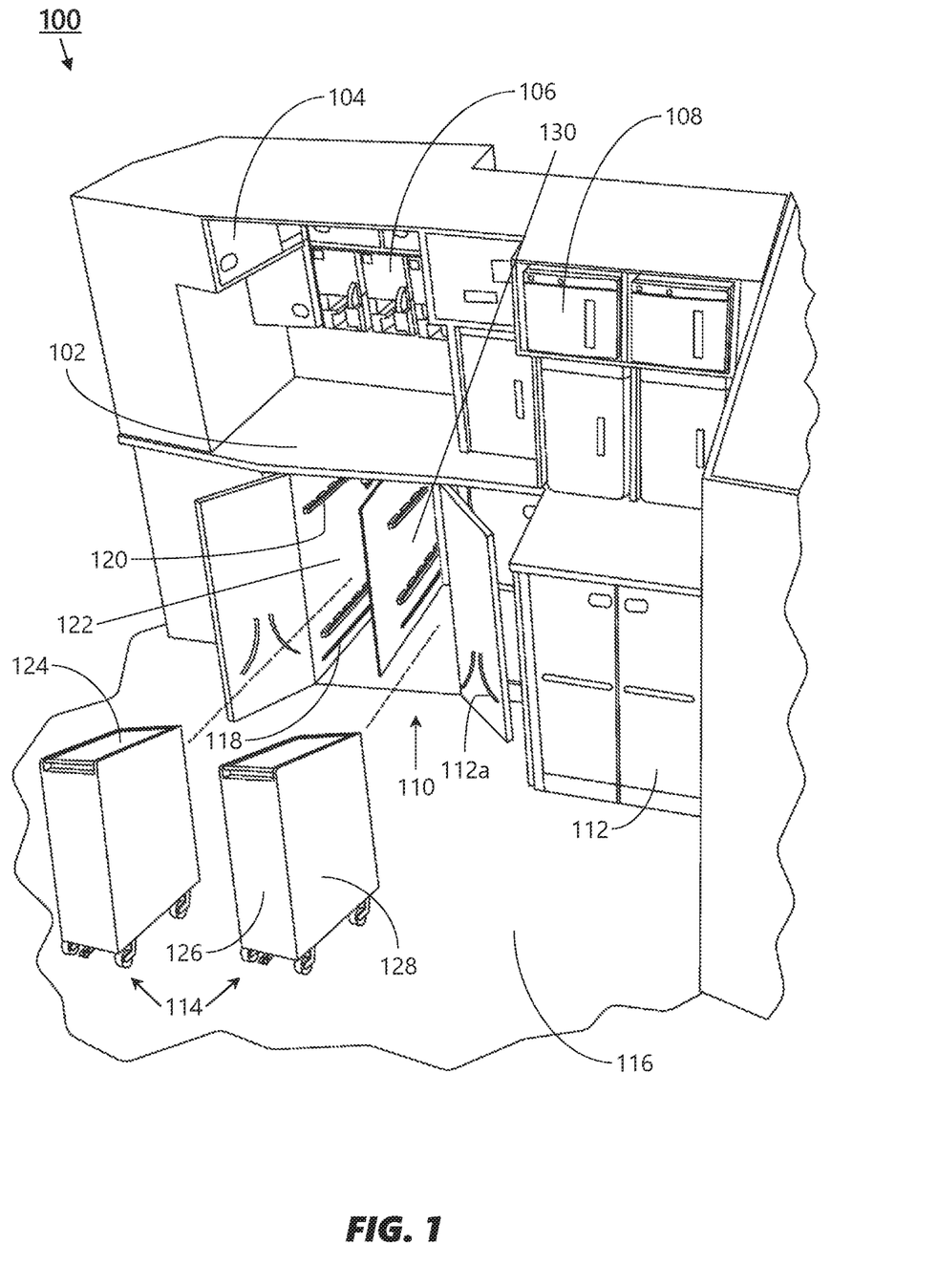
FIG. 1 depicts an exemplary embodiment of an aircraft galley structure according to the inventive concepts disclosed herein.

Referring to FIG. 1, an exemplary embodiment of a galley structure 100 according to the inventive concepts disclosed herein may include one or more workdecks 102 and various configurations of storage compartments 104, beverage makers 106, and standard units 108 (SU) above the workdecks (AWD); standard units may include, e.g., warmer or chiller compartments, ovens, or stand-alone refrigerators. The workdecks 102 may provide an expanded work surface at approximate waist level; below the workdecks the galley structure 100 may incorporate one or more below-workdeck (BWD) cart bays 110 between the workdecks and floor level. For example, a single cart bay 110 may secure, behind an outer front door 112, one or more galley carts (114; e.g., trolleys) in a stowed position. For example, the galley carts 114 may be fully loaded on the ground, and stowed within the cart bays 110 during taxi, takeoff, and landing (TTL) flight segments. When the aircraft reaches a safe cruising altitude, the galley carts 114 may be detached from the galley structure 100 to provide catering and refreshment services to passengers at their seats. Galley carts 114 may be returned to the cart bays 110, e.g., for final descent and landing, or if local turbulence or other atmospheric conditions delay or preclude catering services. The galley structure 100 may be implemented to the aft of the aircraft, e.g., whereby port and starboard galley structures may converge toward a centrally located workspace, or toward the midsection or front of the aircraft, e.g., whereby port and starboard galley structures substantially parallel to the longitudinal axis of the aircraft may be separated by a central aisle. In some embodiments, the galley structure 100 may be implemented laterally, or substantially perpendicular to the longitudinal axis of the aircraft. In any embodiment, the workspace 116 surrounding the workdecks 102 and cart bays 110 may provide sufficient space for galley carts 114 to be detached from, and re-secured into, the cart bays.

Each cart bay 110 may include interior structures for securing the galley carts 114 in a stowed position therewithin, or for directing chilled air to and around the exterior surfaces of the galley cart. For example, the side walls 116 of the cart bay 110 may include wheel guides 118 and rubstrip assemblies 120 for guiding the galley carts 114 into and out of a stowed position within the cart bay. The rubstrip assemblies 120 may be solid or corrugated to enhance airflow as described below (or any appropriate combination thereof). The cart bay 110 may include, set into a rear or upper surface (or even into a side wall 122), one or more plenums or inlets for introducing chilled air into the cart bay, e.g., from an air chiller unit (ACU) of the galley structure 100. The front door 112 of the cart bay 110 may incorporate turning vanes 112a which, in conjunction with the rubstrip assemblies 120, may direct the chilled air over the upper exterior surfaces 124, forward exterior surfaces 126, and side exterior surfaces 128 of the galley cart 114. The cart bay 110 may accommodate one, two, or more galley carts 114 behind a single front door 112. For example, a dual-cart cart bay 110 as shown by FIG. 1 may accommodate two galley carts 114 side by side, separated by a pedestal panel 130. The pedestal panels 130, similarly to the side walls 122, may incorporate wheel guides 118 and rubstrip assemblies 120.

Figure 2A:
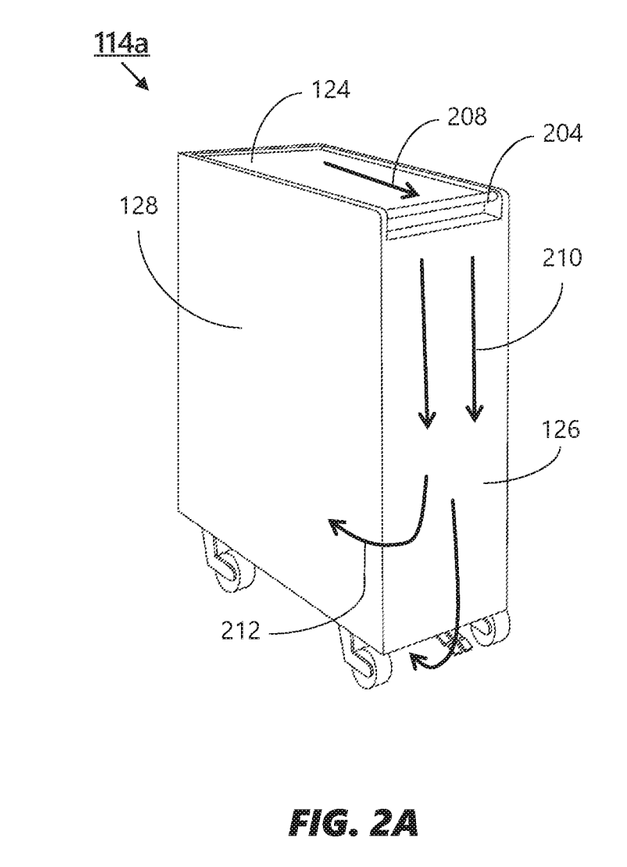
FIGS. 2A and 2B respectively depict a forward isometric view and an aft isometric view of the galley cart of FIG. 1.

Referring to FIG. 2A, the galley cart 114a may be implemented and may function similarly to the galley cart 114 of FIG. 1, except that the galley cart 114a may include wheels or casters 202, a handlebar 204 for manipulating the galley cart into and out of the cart bay (110, FIG. 1), and brakes 206 for securing the galley cart in a stowed position inside the cart bay. While the galley cart 114 is in the stowed position, an air chiller unit (ACU) within the galley structure (100, FIG. 1) may introduce chilled air into the cart bay 110 via, e.g., a plenum or inlet positioned within an upper or rear interior surface of the cart bay. For example, chilled air entering the cart bay 110 from an upper plenum may first be carried forward (208) along the upper exterior surface 124 of the galley cart 114a until the chilled air reaches the interior front door (112, FIG. 1) of the cart bay, at which point the chilled air may be directed downward (210) across the forward exterior surface 126 of the galley cart. The turning vanes (122, FIG. 1) set into the front door 112 may direct the chilled air backward (212) along the side exterior surfaces 128 of the galley cart 114a.

Figure 2B:
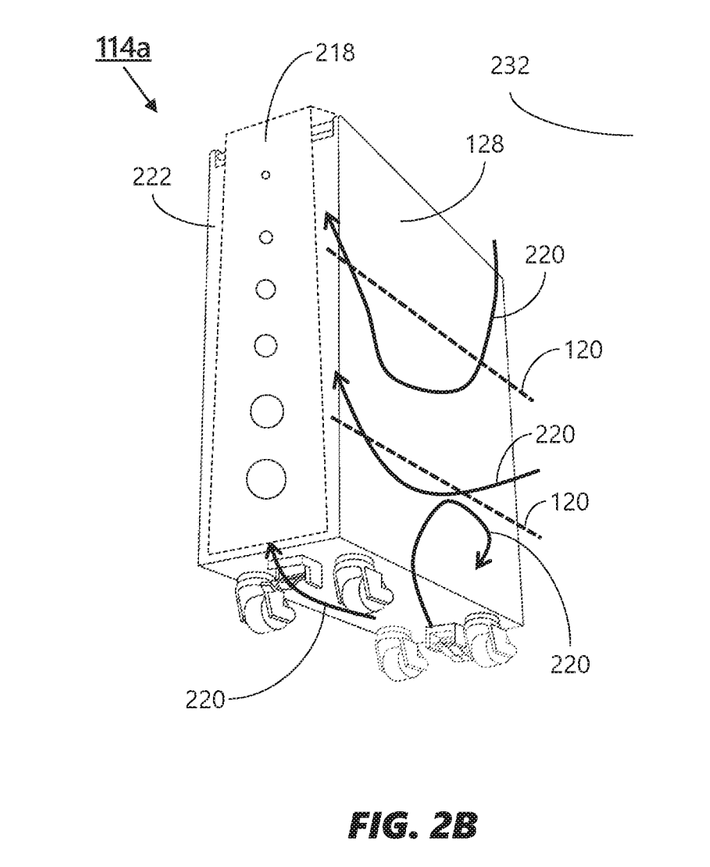

Referring also to FIG. 2B, the chilled air may be directed (214) along the underside 216 of the galley cart 114a toward a return plenum 218 attached to the rear interior surface of the cart bay 110. The placement and/or configuration of rubstrip assemblies 120 on the side walls (122, FIG. 1) of the cart bay 110 may be optimized to maximize the exterior surface area of the galley cart 114a exposed to chilled air. For example, solid rubstrip assemblies 120 may obstruct or trap the flow of chilled air, while corrugated rubstrip assemblies may allow chilled air to pass through, and may additionally be used to direct the flow of chilled air through the cart bay 110. For example, chilled air may pass from the upper exterior surface 124, the forward exterior surface 126, and the underside 216, flowing (220) along the side exterior surface 128 and passing through apertures in the rubstrip assemblies 120 toward the return plenum 218 and the rear exterior surface 222 of the galley cart 114a, from where the chilled air may be, e.g., recirculated throughout the cart bay or directed into a return duct within the galley structure 100.

Figure 3A:
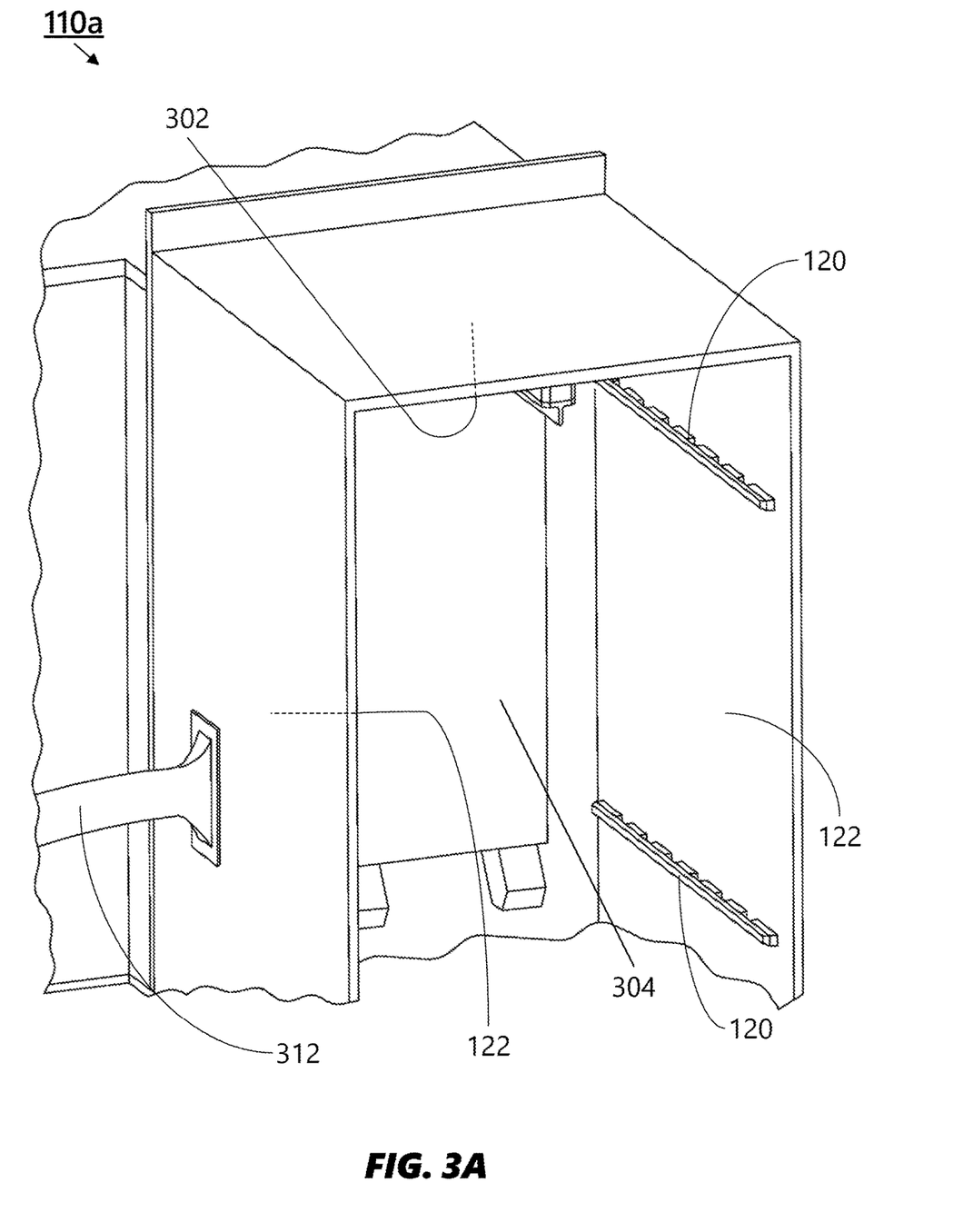
FIGS. 3A and 3B depict a forward view of the cart bay of FIG. 1.
Figure 3B:
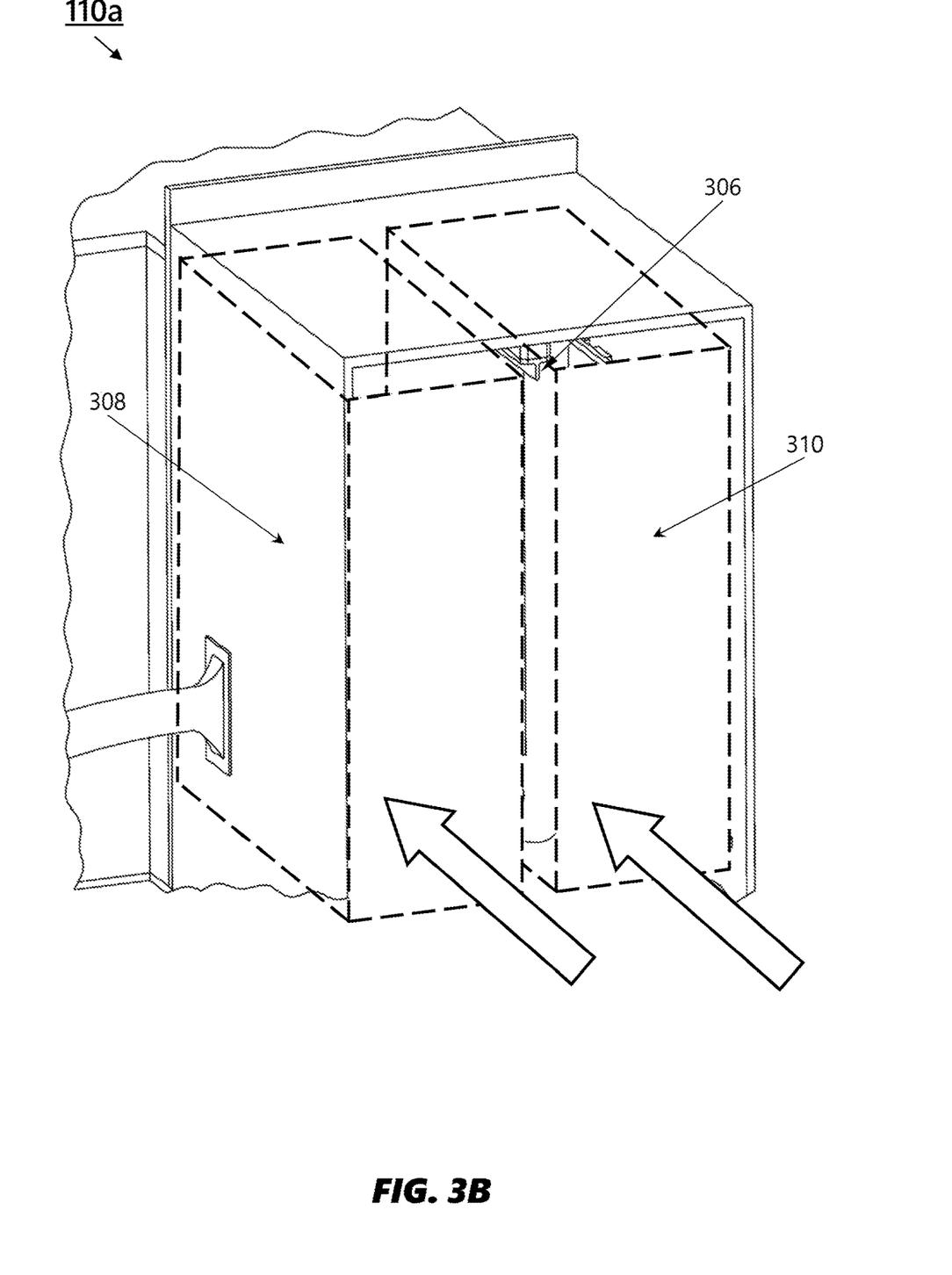

Referring to FIGS. 3A/B, the cart bay 110a may be implemented and may function similarly to the cart bay 100 of FIG. 1, except that the cart bay 110a may include an upper interior surface 302 (which may include one or more chilled-air plenums or inlets), rear interior surface 304, left and right interior surfaces (side walls) 122, upper dividers 306, and rubstrip assemblies 120. For example, chilled air may enter the cart bay 110a via ducts or plenums in the upper interior surface 302 or rear interior surface 304 (from a chilled-air source, e.g., air chiller unit (ACU) within the galley structure (100, FIG. 1)). The cart bay 110a may be configured to stow two galley carts (114, FIG. 1) in adjacent spaces within the cart bay; the upper dividers 306 may be mounted to the upper interior surface 302 above the pedestal panels (130, FIG. 1) for guiding the galley carts 114 into their respective left-side or right-side housings 308, 310 within the cart bay 110 and securing the galley carts in a stowed position therein (e.g., preventing the galley carts from tipping inflight).

Rubstrip assemblies 120 may be mounted to the side walls 122 of the cart bay 110a, e.g., an upper rubstrip assembly and a lower rubstrip assembly positioned below the upper rubstrip assembly. The rubstrip assemblies 120 may extend laterally (e.g., substantially parallel to the aircraft floor and the upper interior surface 302 of the cart bay 110a) between the front door (112, FIG. 1) of the cart bay and the rear interior surface 304 of the cart bay, guiding the galley carts 114 into a stable stowed position within the cart bay. However, solid rubstrips 120 may be angled from the horizontal to direct the flow of chilled air toward a desired surface of the galley cart. The rubstrip assemblies 120 may partially or fully absorb, and thus protect the side walls 122 from, the impact force of a fully loaded galley cart 114 being steered into (or removed from) a stowed position within the cart bay 110a. Further, the rubstrip assemblies 120 may partially or fully absorb noise generated by the galley carts 114 while being transferred in or out of the cart bay 110a. The cart bay 110a may further include one or more return ducts 312 through which chilled air circulated through the cart bay may be returned to the air chiller unit (alternatively, chilled air may be returned through an outlet in the rear interior surface 304 (e.g., via the return plenum 218 shown by FIG. 2B) or recirculated through the cart bay 110a.

Figure 4A:
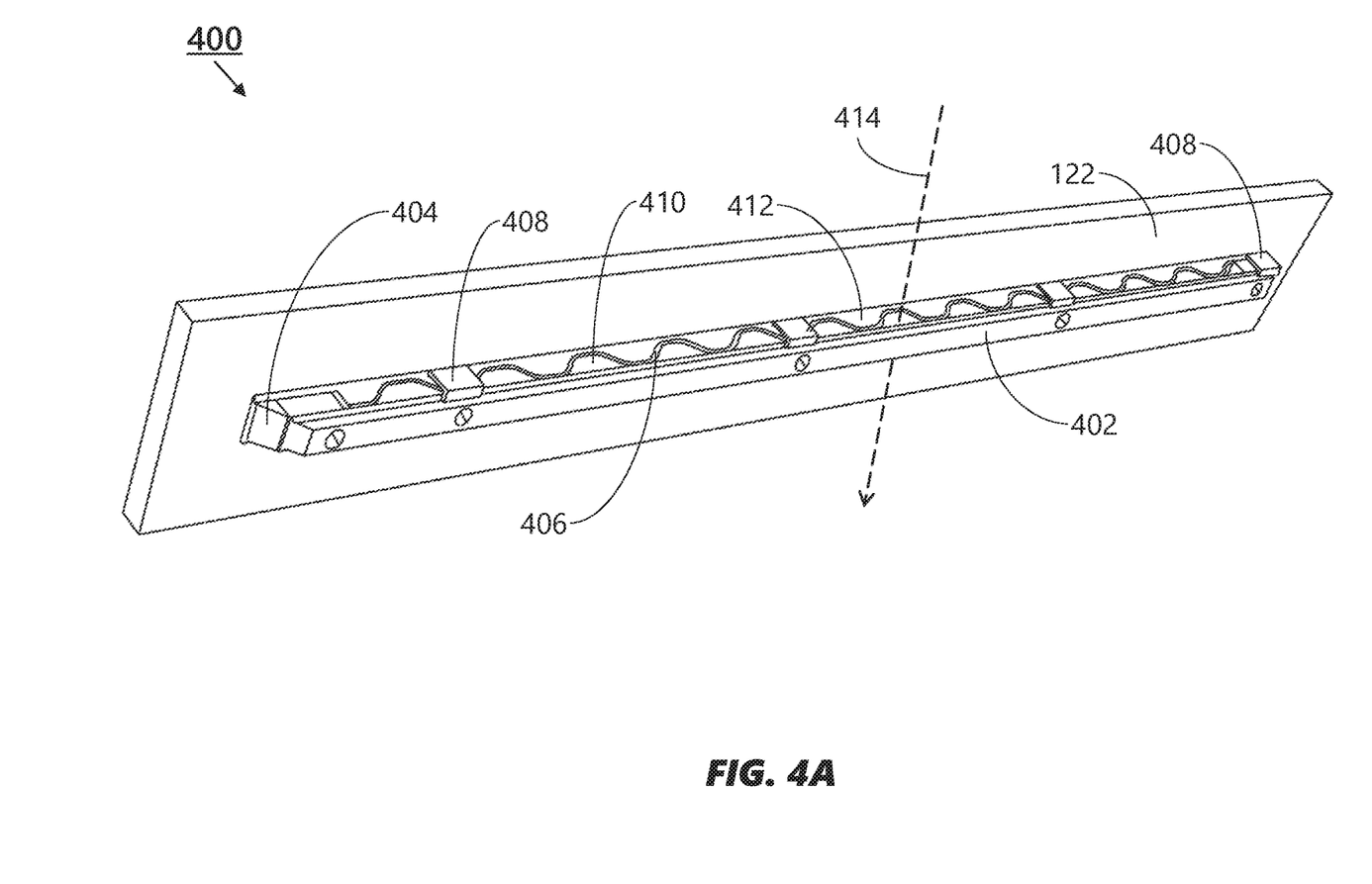
FIGS. 4A and 4B depict isometric views of the rubstrip assembly of FIGS. 3A and 3B.

Referring to FIG. 4A, the rubstrip assembly 400 may be implemented and may function similarly to the rubstrip assembly 120 of FIGS. 3A/B, except that the rubstrip assembly 400 may include a partially or fully flexible outer rubstrip 402 extending between two end caps 404, the rubstrip 402 supported by a corrugated carrier layer 406 (e.g., packer layer) positioned between the rubstrip and the side wall 122 of the cart bay (110a, FIG. 3) (or between the carrier layer 406 and a separate structural panel attached to the side wall 306). For example, the rubstrip 402 and carrier layer 406 may be positioned within a guided rail extrusion 408 set into (e.g., clipped to or otherwise attached to) the side wall 122, from which the rubstrip 402 and/or carrier layer 406 may be easily removable for cleaning or replacement.

The rubstrip 402 may be fashioned of plastics of various Shore hardnesses depending upon the desired degree of noise reduction or desired frequency of replacement (low Shore hardness/noise reduction and frequency of replacement having a generally inverse relationship). The end caps 404 may be solid beveled or chamfered structures capable of guiding the galley cart (114a, FIGS. 2A/B) into alignment (e.g., while removing the galley cart from, or returning the galley cart to, the cart bay 110a) and of protecting the leading edge of the rubstrip assembly 400 from impact forces.

The carrier layer 406 may improve on conventional solid or hollow rubstrips by removing portions of material to create apertures 410 or openings between infill portions (412) of the carrier layer. For example, the carrier layer 406 may be corrugated or castellated in that apertures 410 may be created at regular intervals between the carrier layer and the rubstrip 402. The apertures 410 may be trapezoidal, rectangular, or any other appropriate shape depending on the precise pattern of the carrier layer 406. Chilled air introduced into the cart bay may flow freely (414) through the apertures 410 to portions of the side walls 122 and other exterior surfaces of the galley cart 114a that might otherwise not receive an adequate amount of chilled air due to airflow restriction by solid or hollow rubstrips.

Figure 4B:
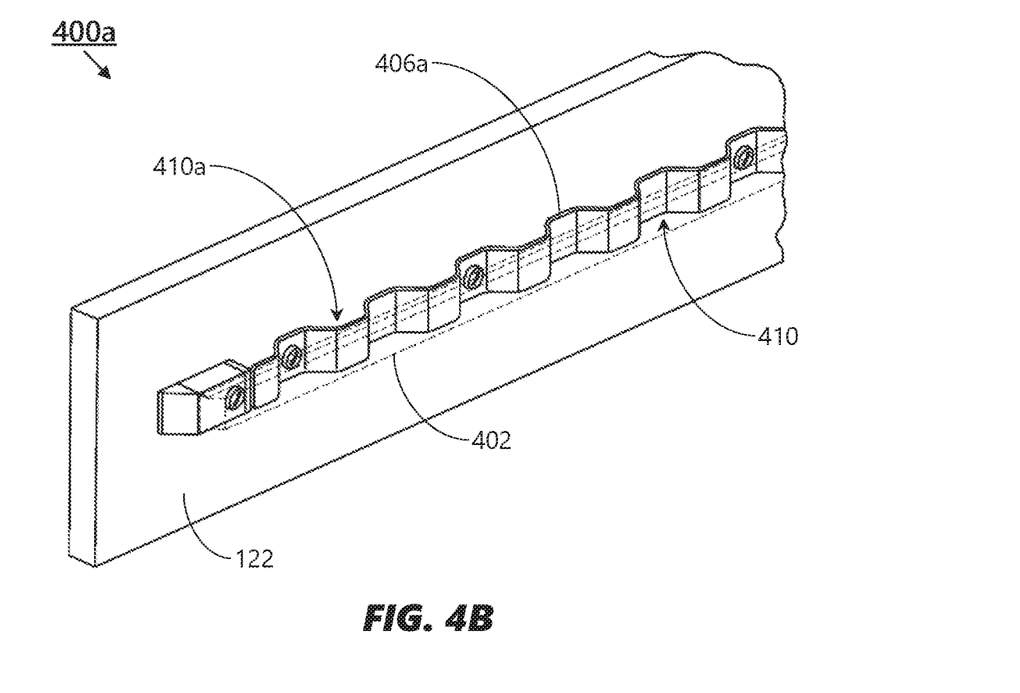

Referring also to FIG. 4B, the rubstrip assembly 400a may be implemented and may function similarly to the rubstrip assembly 400 of FIG. 4A, except that the rubstrip assembly 400a may incorporate a fully open carrier layer 406a capable of creating, in addition to the apertures 410 between the carrier layer 406a and the rubstrip 402, additional apertures 410a between the carrier layer 406a and the side wall 122. The passage of chilled air through the apertures 410, 410a may be manipulated by adjusting the pattern of the carrier layer 406, 406a to provide apertures 410, 410a that are larger or smaller in size, of variable size throughout the rubstrip assembly 400, 400a, or differently spaced or angled along the length of the rubstrip assembly (e.g., to control or direct the flow or chilled air through the apertures).

Figure 4C:
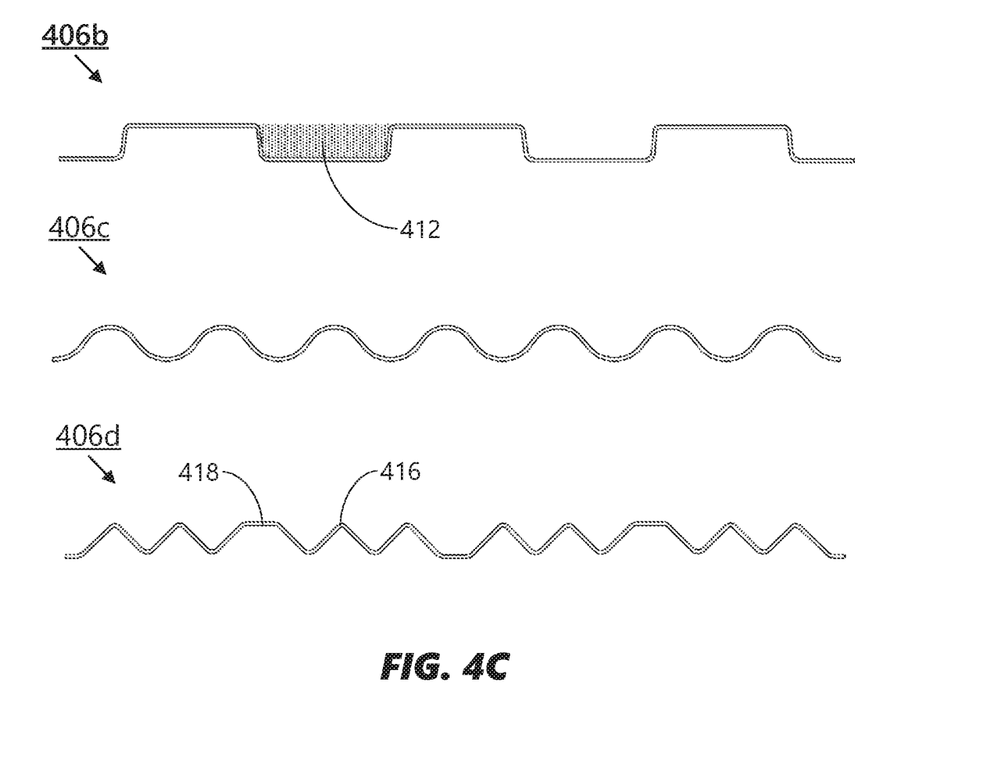
FIG. 4C depicts profile views of the carrier layer of FIG. 4B.

Referring to FIG. 4C, the carrier layers 406b-d may be implemented and may function similarly to the carrier layers 406, 406a of FIGS. 4A/B, except that the carrier layers 406b-d may incorporate a variety of patterns depending upon the desired airflow. For example, in addition to the corrugated or castellated carrier layer 406a shown by FIG. 4B, square-wave carrier layers 406b, sinusoidal or continuous-wave carrier layers 406c, sawtooth carrier layers, or combination-profile carrier layers 406d (e.g., including alternating sawtooth portions 416 and corrugated portions 418) may be employed in partially-open configurations including infill material 412 (e.g., the carrier layer 406 of FIG. 4A), fully-open configurations (e.g., the carrier layer 406a of FIG. 4B), or variable-size configurations.

Figure 5A:
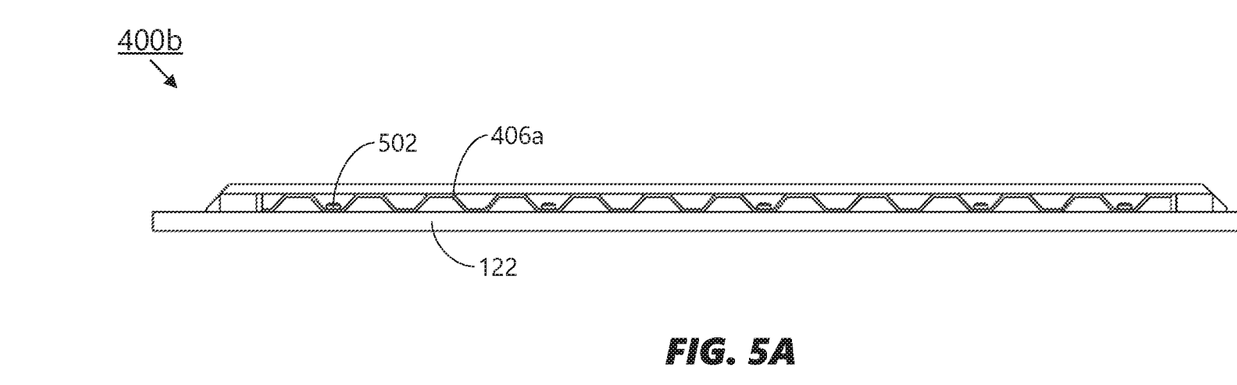
FIGS. 5A and 5B depict profile views of the rubstrip assembly of FIG. 4B.
Figure 5B:
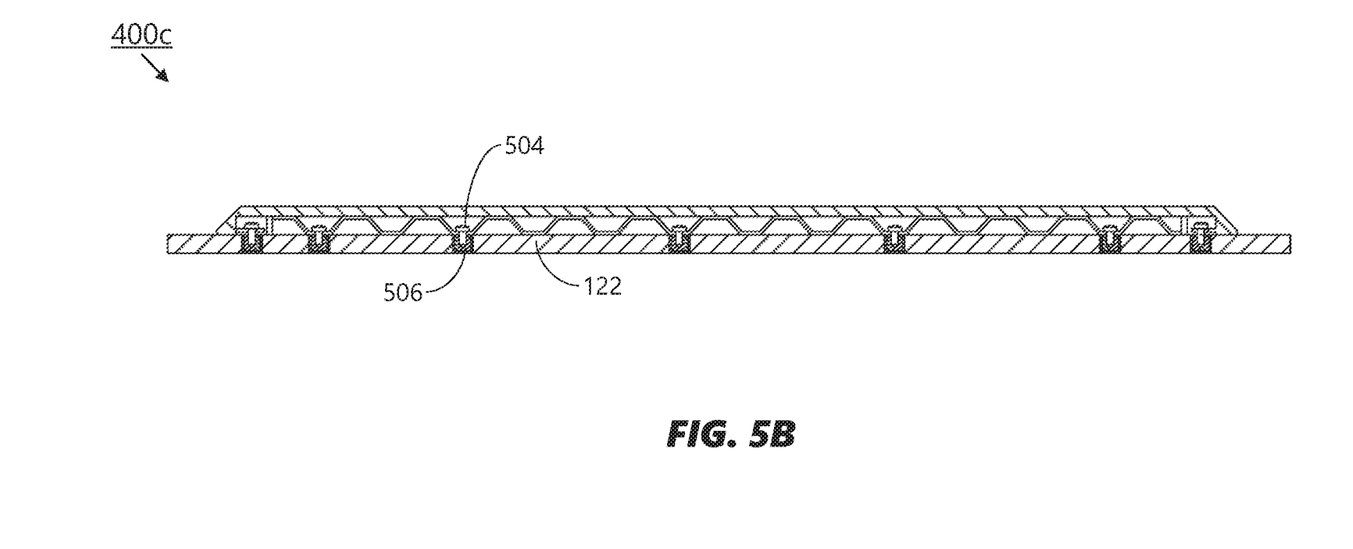

Referring to FIGS. 5A and 5B, the rubstrip assemblies 400b-c may be implemented and may function similarly to the rubstrip assemblies 400, 400a of FIGS. 4A and 4B, except that the rubstrip assemblies 400b-c may be removably fastened or attached to the side wall 122 by one or more mechanical attachments. For example, the rubstrip assembly 400b may be attached to the side wall 122 via one or more magnetic attachments 502 adhering the carrier layer 406a to complementary magnets set into the side wall 122. The rubstrip assembly 400b may be removed from the side wall 122 by pulling with sufficient force to overcome the attraction of the magnetic attachments 502 to the side wall 122. Similarly, the rubstrip assembly 400c may be removably attached to the side wall 122 via a series of removable bolts 504 set through the carrier layer 406a and into corresponding recesses 506 in the side wall. By loosening or removing the bolts 504, the rubstrip assembly 400c may be removed from the side wall for cleaning or replacement of one or more components.

Figure 6:
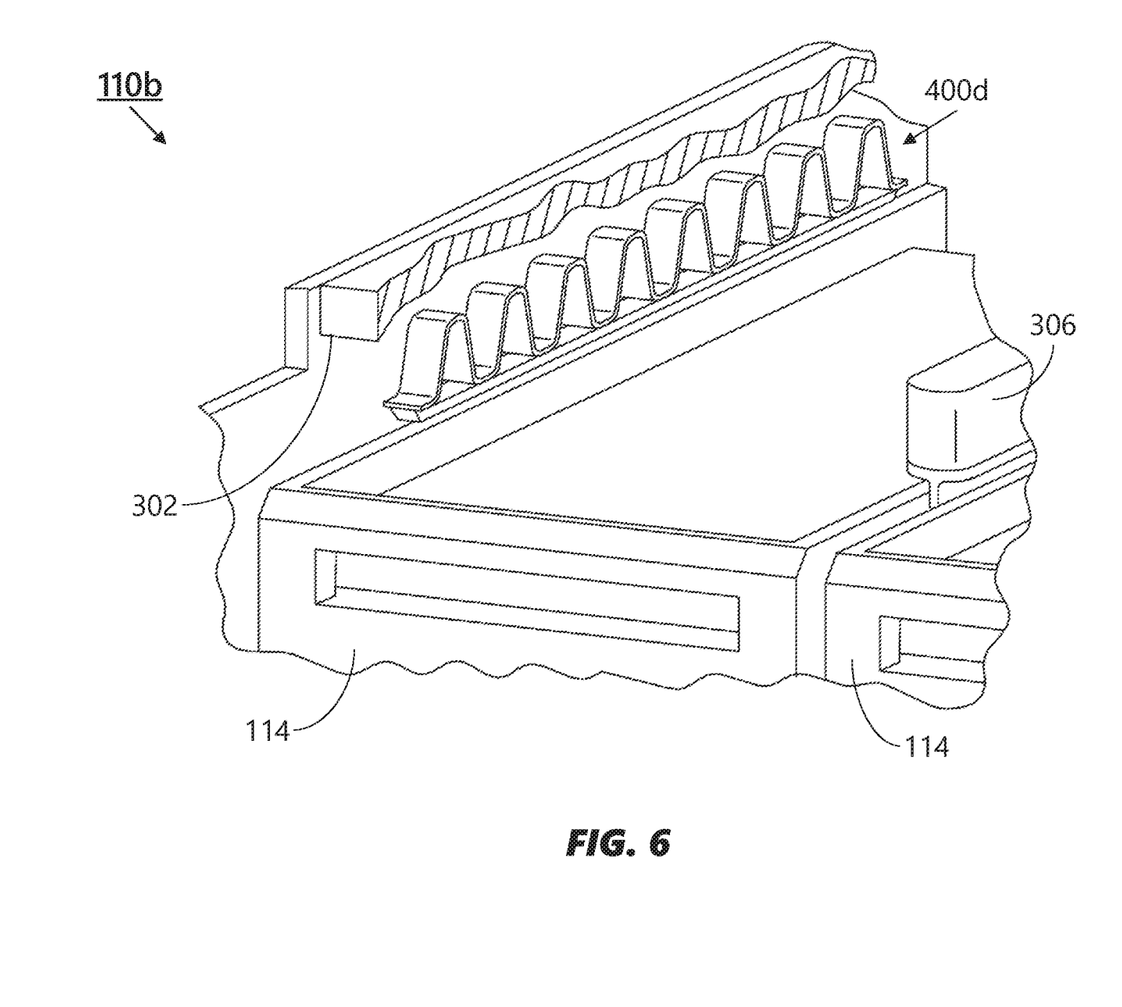
FIG. 6 depicts an isometric view of the cart bay of FIG. 1.

Referring to FIG. 6, the cart bay 110b and the rubstrip assembly 400d may be implemented and may function similarly to the cart bay 110a of FIGS. 3A/B and the rubstrip assemblies 400, 400a-c of FIGS. 4A/B and 5A/B, except that the rubstrip assembly 400d may be attached to the upper interior surface 302 of the cart bay 110b. For example, the rubstrip assembly 400d may provide additional protection (e.g., for the upper interior surface 302) from the impact force of the galley carts 114 while guiding the galley carts into, and out of, their stowed positions within the cart bay 110 (along with, e.g., the upper dividers 306).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An aircraft galley cart bay, comprising:
   a plurality of interior surfaces defining a housing capable of removably securing a galley cart, each interior surface corresponding to an exterior surface of the galley cart, the plurality of interior surfaces comprising:
      at least one first interior surface via which chilled air may be introduced into the cart bay and directed over one or more exterior surfaces of the galley cart, the first interior surface including at least one of a rear surface and an upper surface;
      and
      at least one side interior surface parallel to a direction of travel of the galley cart into the cart bay and adjacent to the first interior surface, the side interior surface including at least one of a left side surface and a right side surface;
   and
   at least one rubstrip assembly attached to the at least one side interior surface, each rubstrip assembly comprising:
      a rail extrusion assembly attached to the side interior surface, the rubstrip assembly removably mounted within the rail extrusion assembly;
      an outer rubstrip extending from a front end cap to a rear end cap parallel to the direction of travel, at least one of the front end cap and the rear end cap capable of guiding the galley cart into the cart bay;
      and
      at least one carrier layer disposed between the outer rubstrip and the side interior surface, the carrier layer defined by at least one pattern configured to create plurality of apertures, each aperture disposed between two adjacent solid portions of the carrier layer and configured to allow airflow along the side interior surface.

2. The aircraft galley cart bay of claim 1, wherein the plurality of apertures is a plurality of first apertures, further comprising:
   a plurality of second apertures disposed between the side interior surface and the carrier layer in a spaced apart relationship.

3. The aircraft galley cart bay of claim 1, wherein the at least one pattern includes one or more of a castellated pattern, a scalloped pattern, a sinusoidal pattern, a sawtooth pattern, a square wave pattern, and a combination of patterns.

4. The aircraft galley cart bay of claim 1, wherein the plurality of apertures comprises:
   at least one first aperture having a first size;
   and
   at least one second aperture having at least one second size different from the first size.

5. The aircraft galley cart bay of claim 1, wherein the first interior surface is an upper surface and the rubstrip assembly is a first rubstrip assembly, further comprising:
   at least one second rubstrip assembly attached to the upper surface.

6. The aircraft galley cart bay of claim 1, wherein at least one of the forward end cap and the rear end cap comprises at least one of a chamfered structure and a beveled structure capable of guiding the galley cart into the cart bay.

7. The aircraft galley cart bay of claim 1, wherein the at least one rubstrip assembly is configured to absorb at least one of an impact force and a noise associated with the galley cart.

8. The aircraft galley cart bay of claim 1, wherein the at least one rubstrip assembly is fashioned of one or more nonmetallic materials.

9. The aircraft galley cart bay of claim 1, wherein the at least one rubstrip assembly is removably attached to the side interior surface via one or more mechanical provisions capable of securing the rubstrip assembly to the side interior surface.

10. The aircraft galley cart bay of claim 9, wherein the one or more mechanical provisions includes at least one of a magnetic assembly and a removable bolt.

11. The aircraft galley cart bay of claim 1, further comprising:
    a front door including at least one deflector configured to redirect airflow within the cart bay.

12. The aircraft galley cart bay of claim 1, wherein the housing is a first housing and the at least one rubstrip assembly is a first rubstrip assembly corresponding to a first galley cart, further comprising:
    a second housing capable of removably securing a second galley cart, the second housing adjacent to the first housing;
    at least one second rubstrip assembly corresponding to the second galley cart;
    and
    at least one upper divider extending at least partially into the cart ban from the upper surface and capable of directing the first galley cart into the first housing and the second galley cart into the second housing.

13. The aircraft galley cart bay of claim 12, wherein the at least one upper divider includes a pedestal panel having at least one third rubstrip assembly attached thereto, the third rubstrip assembly configured to direct either of the first galley cart into the first housing or the second galley cart into the second housing.

14. A galley structure installable aboard an aircraft, the galley structure comprising:
    at least one galley cart capable of transit along an interior surface of the aircraft;
    and
    at least one cart bay configured to removably secure the at least one galley cart therewithin, each cart bay comprising:
       a plurality of interior surfaces defining a housing capable of removably securing a galley cart, each interior surface corresponding to an exterior surface of the galley cart, the plurality of interior surfaces comprising:

at least one first interior surface via which chilled air may be introduced into the cart bay and directed over one or more exterior surfaces of the galley cart, the first interior surface including at least one of a rear surface and an upper surface;

and at least one side interior surface parallel to a direction of travel of the galley cart into the cart bay and adjacent to the first interior surface, the side interior surface including at least one of a left side surface and a right side surface;

and at least one rubstrip assembly attached to the at least one side interior surface, each rubstrip assembly comprising:

a rail extrusion assembly attached to the side interior surface, the rubstrip assembly removably mounted within the rail extrusion assembly;

an outer rubstrip extending from a front end cap to a rear end cap parallel to the direction of travel, at least one of the front end cap and the rear end cap capable of guiding the galley cart into the cart bay;

and at least one carrier layer disposed between the outer rubstrip and the side interior surface, the carrier layer defined by at least one pattern configured to create plurality of apertures, each aperture disposed between two adjacent solid portions of the carrier layer and configured to allow airflow along the side interior surface.

15. The galley structure of claim 14, wherein the plurality of apertures is a plurality of first apertures, further comprising:

a plurality of second apertures disposed between the side interior surface and the carrier layer in a spaced apart relationship.

16. The galley structure of claim 14, wherein the plurality of apertures comprises:

at least one first aperture having a first size;

and at least one second aperture having at least one second size different from the first size.

* * * * *